(12) United States Patent
Alivisatos et al.

(10) Patent No.: US 6,984,369 B1
(45) Date of Patent: Jan. 10, 2006

(54) PROCESS FOR MAKING SURFACTANT CAPPED METAL OXIDE NANOCRYSTALS, AND PRODUCTS PRODUCED BY THE PROCESS

(75) Inventors: A. Paul Alivisatos, Berkeley, CA (US); Joerg Rockenberger, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 332 days.

(21) Appl. No.: 09/721,126

(22) Filed: Nov. 22, 2000

Related U.S. Application Data

(63) Continuation-in-part of application No. 09/702,219, filed on Oct. 30, 2000, now Pat. No. 6,440,213.
(60) Provisional application No. 60/162,299, filed on Oct. 28, 1999.

(51) Int. Cl.
*C01B 13/00* (2006.01)

(52) U.S. Cl. .................... 423/592.1; 423/263; 423/605; 423/274; 423/607; 423/608; 423/632; 423/594.17; 423/622; 423/604; 423/594.19; 423/624; 423/636; 423/606; 423/594.18; 423/618; 423/619; 423/617; 423/249

(58) Field of Classification Search ................ 423/263, 423/592, 274, 605, 607, 608, 632, 594.17, 423/622, 604, 594.19, 592.1, 624, 636, 606, 423/594.18, 618, 619, 617, 249
See application file for complete search history.

(56) References Cited

U.S. PATENT DOCUMENTS 6,440,213 B1 * 8/2002 Alivisatos et al. ............ 117/68

OTHER PUBLICATIONS

Rockenberger, J. et al., A New Nonhydrolytic Single-Precursor Approach to Surfactant-Capped Nanocrystals of Transition Metal Oxides, J. Am. Chem. Soc. Nov. 24, 1999, 121, 11595–6.*
Bentzon, M.D. et al, "Ordered aggregates of ultrafine iron oxide particles: 'super crystals'," Philosophical Magazine B, vol. 60 (No. 2), p. 169–178, (1989), no month.
Shmakov, A.N. et al, "Vacancy Ordering in Gamma–Fe2O3: Synchrotron X–ray Powder Diffraction and High–Resolution Electron Microscopy Studies," J. Appl. Cryst., vol. 28, p. 141–145, (1995), no month.
Murray, C.B. et al, "Synthesis and Characterization of Nearly Monodisperse CdE (E=S, Se, Te) Semiconductor Nanocrystallites," J. Am. Chem. Soc., vol. 115, p. 8706–8715, (1993), no month.
Fleet, M.E., "The Structure of Magnetite," Acta Cryst., vol. B37, p. 917–920, (1981), no month.
Van Der Helm, D. et al, "The Crystal Structure of Iron Cupferron Fe(O2N2C6H5)3," Acta Cryst., vol. 18, p. 355–362, (1965), no month.
Tamaki, K. and Okabe, N., "Manganese Cuperronate," Acta Cryst., vol. C52, p. 1612–1614, (1996), no month.
Elerman, Yalcin, "Bis(cupferronato)copper(II), [Cu(C6H5N2O2)2]," Acta Cryst., vol. C51, p. 1520–1522, (1995), no month.
Chemseddine, A. and Weller, H., "Highly Monodisperse Quantum Sized CdS particles by Size Selective Precipitation," Ber. Bunsenges Phys. Chem., vol. 97 (No. 4), p. 636–637, (1993), no month.
Murray, C.B. et al, "Self–Organization of CdSe Nanocrystallites into Three–Dimensional Quantum Dot Superlattices," Science, vol. 270, p. 1335–1338, (Nov. 24, 1995).
Ziolo, R.F. et al, "Matrix–Mediated Synthesis of Nanocrystalline Gamma–Fe2O3: A New Optically Transparent Magnetic Material," Science, vol. 25, p. 219–223, (Jul. 10, 1992), no month.
Matijevic, Egon, "Preparation and Properties of Uniform Size Colloids," Chem. Mater., vol. 5, p. 412–426, (1993), no month.
Kellner, R. Und Prokopowski, P., "Infrarotspektroskopische Untersuchungen an Metallcupferronaten im Bereich 4000— 32 cm(–10)," Analytica Chimica Acta, vol. 86, p. 175–184, (1976), no month.
Sun, Shouheng and Murray, C.B., "Synthesis of monodisperse cobalt nanocrystals and their assembly into magnetic superlattices (invited)," J. Appl. Phys., vol. 85 (No. 8), p. 4325–4330, (Apr. 15, 1999).
Trentler, T.J. et al, "Synthesis of TiO2 Nanocrystals by Nonhydrolytic Solution–Based Reactions," J. Am. Chem. Soc., vol. 121, p. 1613–1614, (1999), no month.
Peng, X. et al, "Kinetics of II–VI and III–V Colloidal Semiconductor Nanocrystal Growth: "Focusing" of Size Distributions," J. Am. Chem. Soc., vol. 120, p. 5343–5344, (1998), May.
Moumen, N. and Pileni, M.P., "New Syntheses of Cobalt Ferrite Particles in the Range 2–5 nm: Comparison of the Magnetic Properties of the Nanosized Particles in Dispersed Fluid or in Powder Form," Chem. Mater., vol. 8, p. 1128–1134, (1996), no month.

* cited by examiner

*Primary Examiner*—Steven Bos
(74) *Attorney, Agent, or Firm*—Charles R. Nold; Lawrence Berkeley; National Laboratory

(57) ABSTRACT

Disclosed is a process for making surfactant capped nanocrystals of metal oxides which are dispersable in organic solvents. The process comprises decomposing a metal cupferron complex of the formula $M^xCup_x$, wherein M is a metal, and Cup is a N-substituted N-Nitroso hydroxylamine, in the presence of a coordinating surfactant, the reaction being conducted at a temperature ranging from about 150 to about 400° C., for a period of time sufficient to complete the reaction. Also disclosed are compounds made by the process.

20 Claims, 8 Drawing Sheets

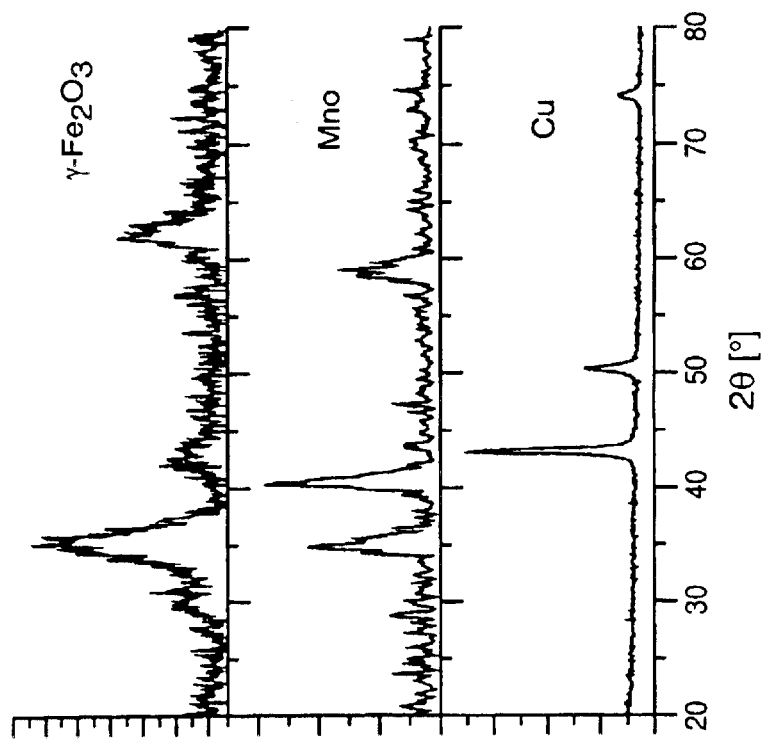
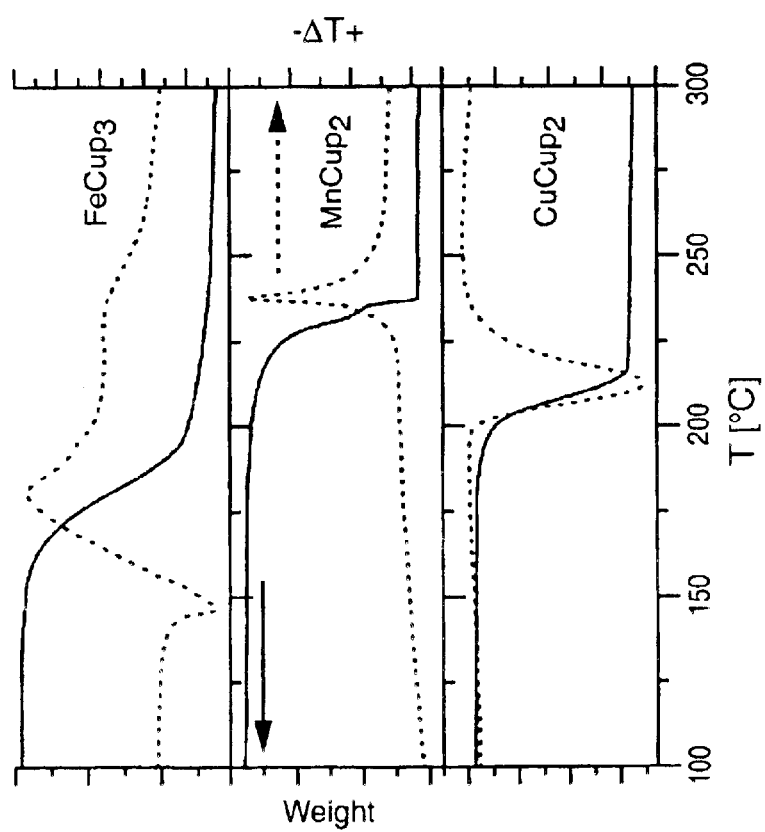

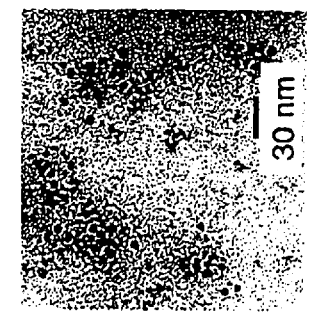
FIG._2c
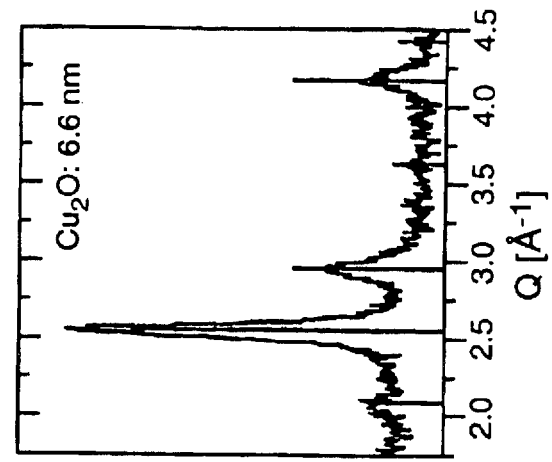
FIG._3c
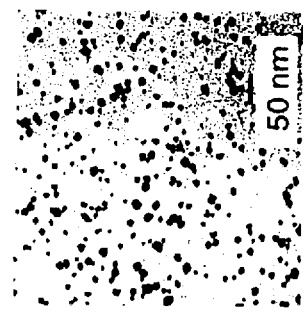
FIG._2b
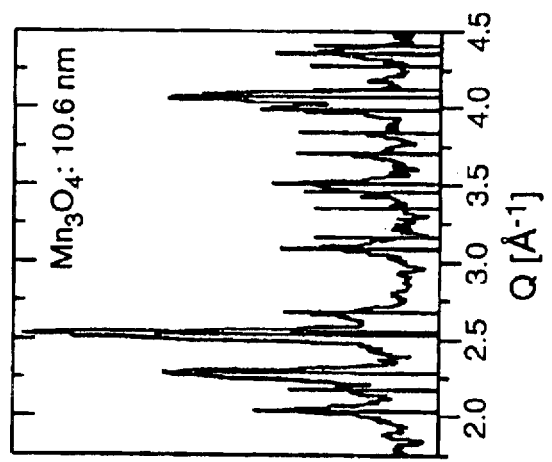
FIG._3b
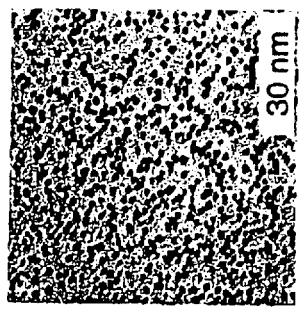
FIG._2a
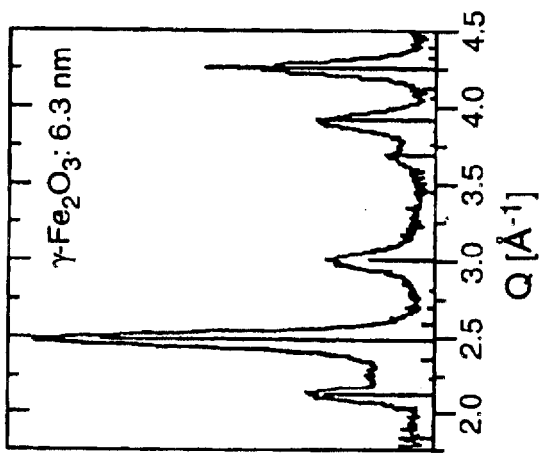
FIG._3a

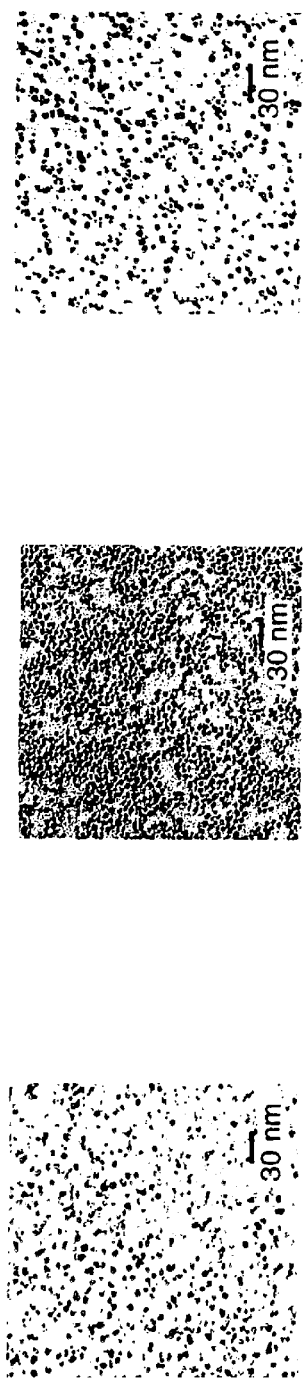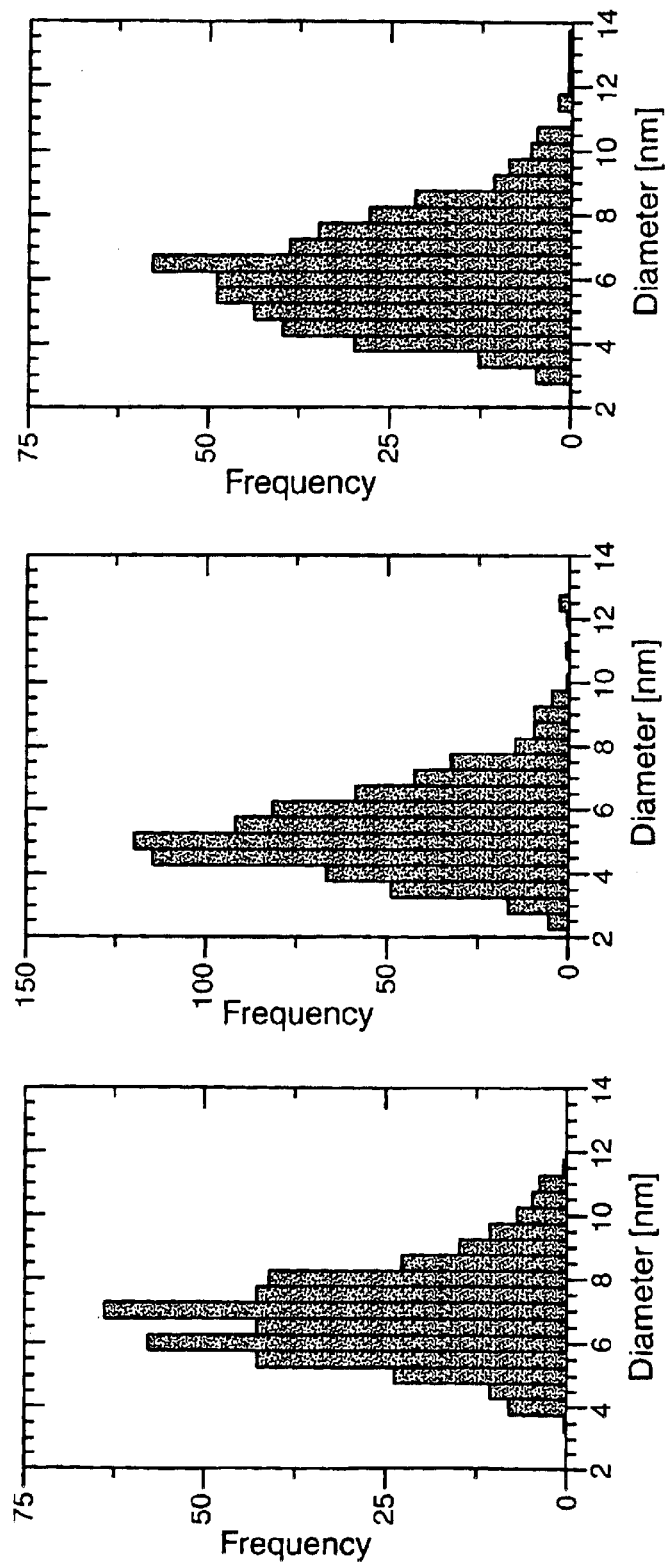

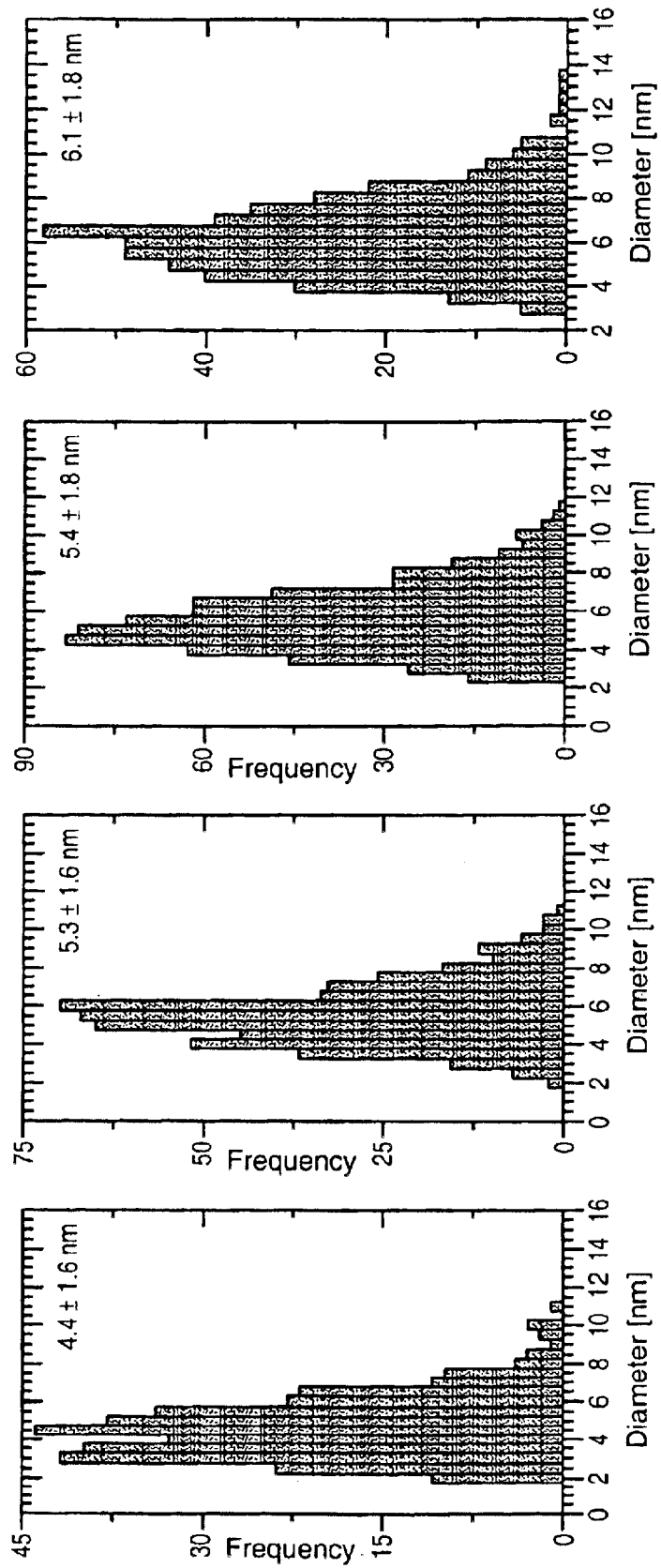

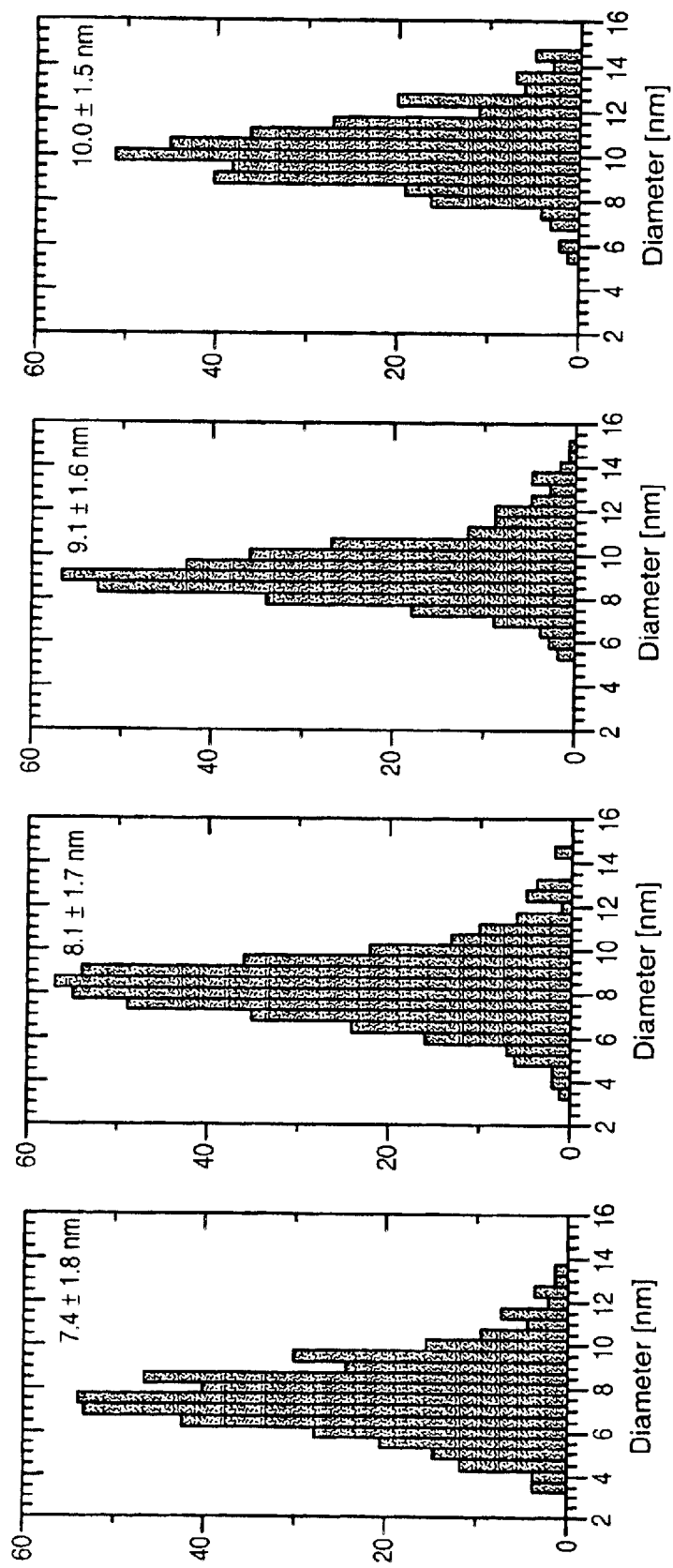

FIG._7b
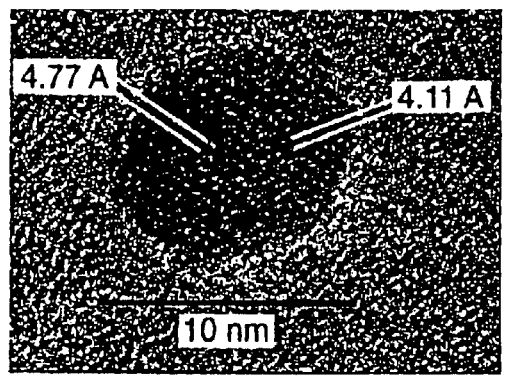
FIG._7c
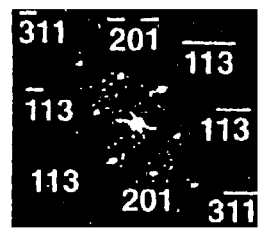
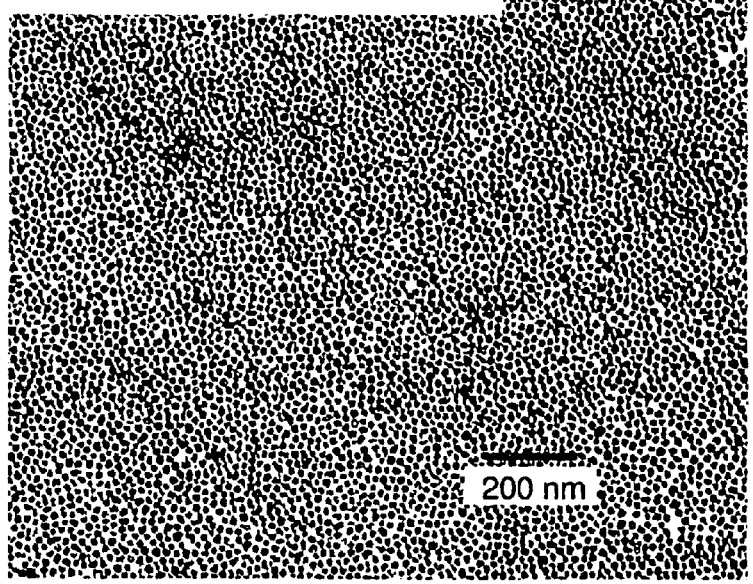
FIG._7a

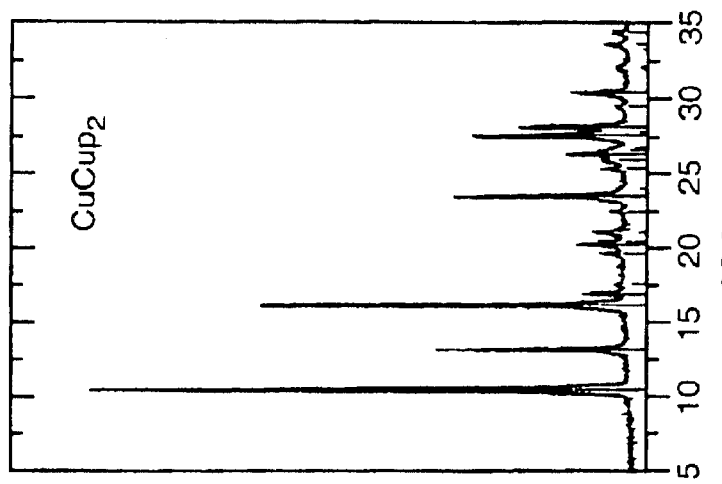
FIG._8c
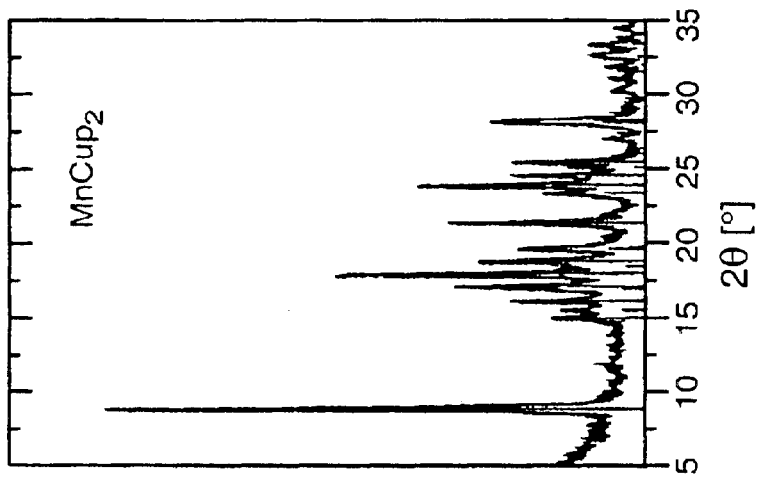
FIG._8b
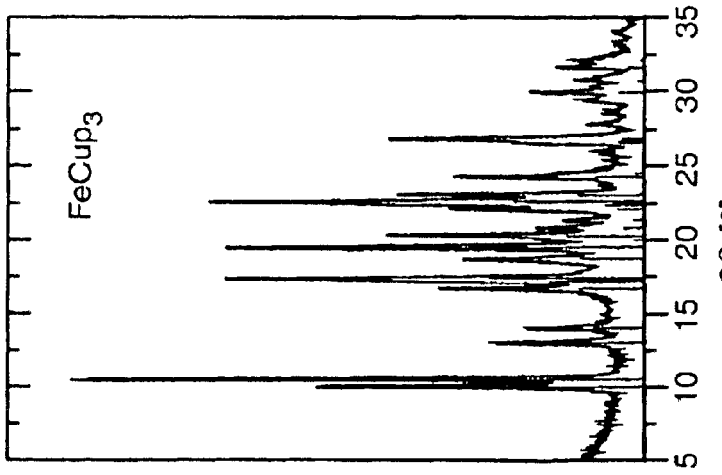
FIG._8a

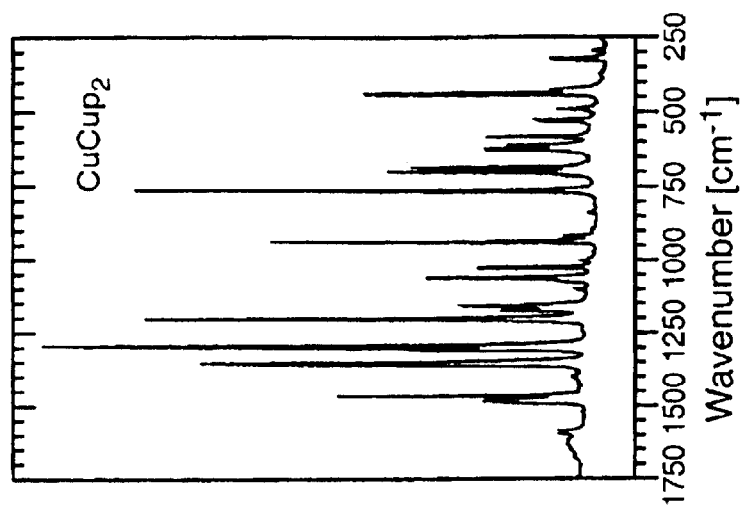
FIG._9c
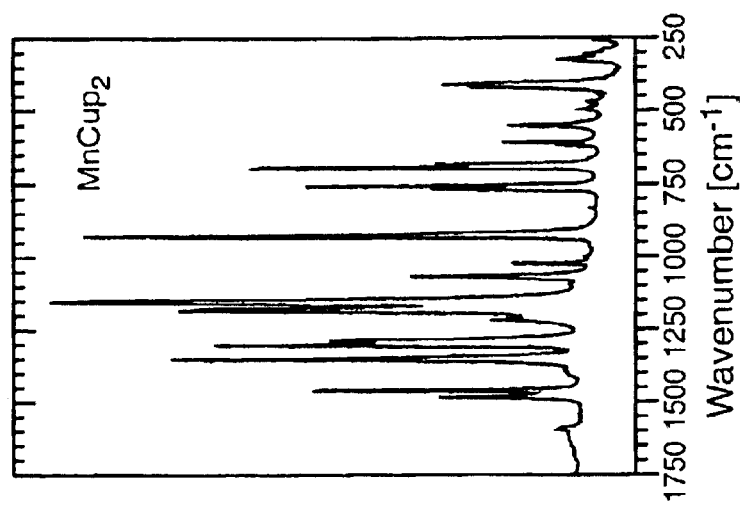
FIG._9b
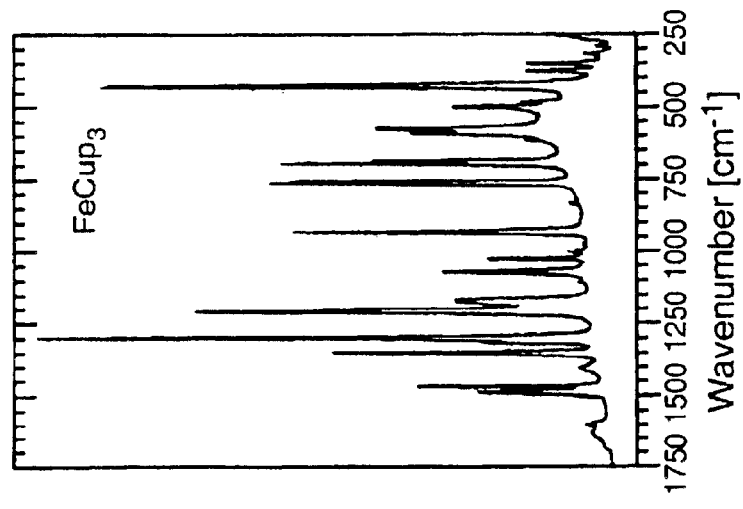
FIG._9a

PROCESS FOR MAKING SURFACTANT CAPPED METAL OXIDE NANOCRYSTALS, AND PRODUCTS PRODUCED BY THE PROCESS

CROSS REFERENCE TO RELATED APPLICATIONS

This application claims priority under 35 U.S.C. 119, based an Provisional patent application Ser. No. 60/162,299, filed Oct. 28, 1999 is a continuation-in-part of and application Ser. No. 09/702,219 entitled, A Process For Making Surfatant Capped Nanocrystals, filed Oct. 30, 2000, now U.S. Pat. No. 6,440,213, both of which are incorporated by reference herein in their entirety.

STATEMENT REGARDING FEDERAL SPONSORSHIP

The invention described herein arose in the course of, or under, contract No. DE-AC03-SF00098 between the United States Department of Energy and the Regents, University of California for the operation of the Ernest Orlando Lawrence Berkeley National Laboratory.

BACKGROUND OF THE INVENTION

This invention relates to a process for making dispersable surfactant capped nanocrystals. More particularly, it relates to a process for making dispersable surfactant capped nanocrystals of metal oxides with non-hydroxylated particle surfaces using a non-hydrolytic single precursor approach, and to the nanocrystals made thereby. Still more particularly, it relates to a process for making dispersable surfactant capped nanocrystals of transition metal oxides.

The advent of new methods to prepare semiconductor and metal nanocrystals, specifically the injection of molecular precursors into hot organic surfactants, has yielded markedly improved samples with good size control, narrow size distributions, and good crystallinity of individual and dispersable nanocrystals (see references 1–3). It is of considerable interest to apply these methods to the synthesis of metal oxide nanocrystals, particularly transition metal oxide nanoparticles, which typically are prepared by methods involving water as solvent or reactant (4–9). Using nonhydrolytic preparations of metal oxide nanocrystals at high temperature in organic surfactants in the absence of air or water, one observes markedly different properties with respect to defect structure and surface composition. So far as applicants are aware, there has been only one example of the solution-based nonhydrolytic synthesis of individual $TiO_2$ nanocrystals (10). Metal oxide nanocrystals with nonhydroxylated surfaces are believed to have significant advantages for applications in catalysis, ceramics, energy storage, magnetic data storage, sensors, ferrofluids, etc.

The following references contain useful background information pertaining to this invention, and are incorporated by reference herein in their entirety.

1. Murray, C. B.; Norris, D. J.; Bawendi, M. G. J. Am. Chenm Soc. 1993, 115, 8706–8715.

2. Peng, X.; Wickham, J.; Alivisatos, A. P. J. Am. Chem. Soc. 1998, 120, 5343–5344.

3. Sun, S.; Murray, C. J. Appl. Phys. 1999, 85, 4325–4330.

4. Charles, S. W.; Popplewell, J. Ferromagnetic Materials; Northholland Publishing Co.: Amsterdam, New York, Oxford, 1982; Vol. 2.

5. Brinker, C. J.; Scherer, G. W. Sol-Gel Science; Academic Press: San Diego, 1990.

6. Ziolo, R. F.; Giannelis, E. P.; Weinstein, B. A.; O'Horo, M. P.; Ganguly, B. N.; Mehrotra, V.; Russell, M. W.; Hufftnan, D. R. Science 1992, 257, 219–223.

7. Matijevic, E. Chem. Mater. 1993, 5, 412.

8. Moumen, N.; Pileni, M. P. Chem. Mater. 1996, 8, 1128.

9. Ying, J. Y. Special Issue: Sol-Gel Derived Materials. In Cheim Mater. 1997, 9, 2247–2670.

10. Trentler, T. J.; Denler, T. E.; Bertone, J. F.; Agrawal, A.; Colvin, V. L. J. Am. Chem. Soc. 1999, 121, 1613–1614.

11. Comprehensive coordination chemistry: the synthesis, reactions, properties & applications of coordination compounds, 1st ed.; Pergamon Press: Oxford, England, 1987; Vol. 2, Chapter 15.9.2.

12. Helm, D. v. d.; Merritt, L. L.; Degeilh, R.; MacGillavry, C. H. Acta Crystallogr. 1965, 18, 355–362.

13. Elerman, Y.; Atakol, O.; Svoboda, I.; Geselle, M. Acta Crystallogr. C 1995, 51, 1520–1522.

14. Tamaki, K; Okabe, N. Acta Crystallogr. C 1996, 52, 1612–1614.

15. Keilner, R.; Prokopowski, P. Anal. Chim. Acta 1976, 86, 175–184.

16. Nolze, G.; Kraus, W. Powder Diffr. 1998, 13, 256–259.

17. Shmakov, A. N.; Kryukova, G. N.; Tsybulya, S. V.; Chuvilin, A. L.; Solovyeva, L. P. J. Appl. Crystallogr. 1995, 28,141.

18. Jarosch, D. Mineral. Petrol. 1987, 37, 15–23.

19. Neuburger, M. C. Z. Phys. 1930, 67, 845–850.

20. Cullity, B. D. Elements of X-ray Diffraction, 2nd ed.; Addison-Wesley: Reading, MA, 1978.

21. Bentzon, M. D.; Wonterghem, J. v.; Morup, S.; Tholen, A.; Koch, C. J. W. Philos. Mag. B 1989, 60, 169–178.

22. Murray, C. B.; Kagan, C. R.; Bawendi, M. G. Science 1995, 270, 1335–1338.

23. Chemseddine, A.; Weller, H. Ber. Bunsen-Ges. Phys. Chem. 1993, 97, 636–637.

24. Fleet, M. E. Acta Crystallogr. B 1981, 37, 917–920.

25. Cornell, R. M.; Schwertmann, U. The Iron Oxides-Structure, Properties, Reactions, Occurrence and Uses, 1st ed.; VCH Verlagsgesellschaft: Weinheim, Germany, 1996.

26. *Reagent Chemicals: American Chemical Society Specifications*; 8th ed.; American Chemical Society: Washington, D.C., 1993.

SUMMARY OF THE INVENTION

It is an object of this invention to provide a non-hydrolytic process for the preparation of metal oxide nanocrystals.

It is a further object of this invention to provide a non-hydrolytic process for the preparation of transition metal oxide nanocrystals having non-hydroxylated surfactant capped surfaces.

It is a further object of this invention to provide surfactant capped metal oxide nanocrystals with non-hydroxylated surfaces which are dispersable in organic solvents, and a process of preparing them It is a still further object of this invention to provide new and novel metal oxide nanocrystals.

These, and other objects are achieved by (a) rnixing a solution of a metal cupferron precursor complex of the formula $M^XCup_X$, wherein $M^X$ is a metal ion in the oxidation state X selected from the group consisting of elements in Group 2, Group 3–12 of the 4$^{th}$ period, Group 3–6 of the 5$^{th}$ and 6$^{th}$ period, Group 10–12 of the 5$^{th}$ period, Group 12 of the 6$^{th}$ period, and Group 13$^{th}$ to 15$^{th}$, and the Lanthanide and Actinide series of the periodic table, and Cup is a N-substituted N-Nitroso hydroxylamine, with a coordinating surfactant, and (b) heating the mixture at a temperature and for a sufficient period of time to cause thermal decomposition of the M$^X$Cup$_X$ precursor and formation of the desired nanocrystals.

As used herein, the term "coordinating surfactant" means an organic molecule consisting of a polar headgroup and an apolar group providing stabilization against coagulation and precipitation of particles by binding to particle surfaces through the polar headgroup and allowing dispersion of particles in aliphatic, aromatic and halogenated hydrocarbons.

BRIEF DESCRIPTION OF THE DRAWINGS

FIG. 1 shows the result of the thermal analysis of iron, manganese and copper cupferronate in a TGA/DTA apparatus under N$_2$-flow (left). To the right, the xrd patterns of the respective decomposition products are displayed.

FIG. 2 and 3 present low-resolution TEM images as well as XRD patterns of γ-Fe$_2$O$_3$, Mn$_3$O$_4$, and Cu$_2$O nanocrystals, respectively.

FIG. 4 presents low-resolution TEM images as well as derived particle size distributions of γ-Fe$_2$O$_3$ nanocrystals prepared under varying synthesis conditions.

FIG. 5 shows particle size distributions derived from low-resolution TEM imaging as a function of refluxing time after the precursor injection.

FIG. 6 describes the increasing average particle size as the reaction precipitate is subsequently extracted with Toluene.

FIG. 7, shows a low-resolution TEM image of a monolayer of individual γ-Fe$_2$O$_3$ nanocrystals (10.0±1.5 nm) covering an area bigger than 2 $\mu$m$^2$. Top left: High-resolution TEM image of one of the nanocrystals in this sample. The indicated lattice plane distances correspond to the (113) and (201) lattice planes of tetragonal γy-Fe$_2$O$_3$ with ordered superlattice of the cation vacancies. Top right: FFT of the high-resolution TEM image looking down the [51-2] zone-axis.

FIG. 8 and 9 present XRD patterns as well as FF-IR spectra of the iron, manganese and copper cupferronates, respectively.

DETAILED DESCRIPTION OF THE INVENTION

We have now discovered a new nonhydrolytic single-precursor approach to the synthesis of dispersable nanocrystals of metal oxides, particularly transition metal oxides.

The process comprises: (a) mixing a solution of a metal cupferron precursor complex of the formula M$^X$Cup$_X$, wherein M$^X$ is a metal ion in the oxidation state X selected from the group consisting of elements in Group 2, Group 3–12 of the 4$^{th}$ period, Group 3–6 of the 5$^{th}$ and 6$^{th}$ period, Group 10–12 of the 5$^{th}$ period, Group 12 of the 6$^{th}$ period, and Group 13$^{th}$ to 15$^{th}$, and the Lanthanide and Actinide series of the periodic table, and Cup is a N-substituted N-Nitroso hydroxylamine, with a coordinating surfactant , and (b) heating the mixture at a temperature and for a sufficient period of time to cause thermal decomposition of the M$^X$Cup$_X$ precursor and formation of the desired nanocrystals.

While the process described below is focused primarily on the preparation of transition metal oxide nanocrystals, it is equally applicable to the formation of any metal oxide nanocrystal where the metal (M$^X$) is a metal ion in the oxidation state X selected from the group consisting of elements in Group 2, Group 3–12 of the 4$^{th}$ period, Group 3–6 of the 5$^{th}$ and 6$^{th}$ period, Group 10–12 of the 5$^{th}$ period, Group 12 of the 6$^{th}$ period, and Group 13$^{th}$ to 15$^{th}$, and the Lanthanide and Actinide series of the periodic table.

The value for X will vary, depending on which metal is used in the formation of the precursor, and the oxidation state of the metal. In general, however, X will range from 1 to 4.

Metal Cupferron complexes M$^X$ Cup$_X$ (M: metal ion; Cup: N-nitroso N-phenylhydroxylamine, C6H5N(NO)O—), with the metal ion coordinated via the oxygen atoms of the Cup ligand in a bidentate manner, proved to be promising as molecular precursors. Metal cupferronates are used in the precipitation or extraction of metal ions from aqueous solution, and are easily prepared for many metal elements (11). In the following, we demonstrate that injecting solutions of metal Cupferron complexes in octylamine into long-chain amines at 250–300° C. yields nanocrystals of iron oxide, manganese oxide, and copper oxide. These nanocrystals range from 4 to 10 nm in diameter, are crystalline, and are dispersable in organic solvents. As Cupferron complexes are available for almost all metal elements, the use of this precursor offers an interesting general approach to metal oxide nanocrystals.

The preparation of the metal Cupferron precursor is based on the precipitation of metal ions from aqueous solution at a specific pH with Cupferron, the ammonium salt of N-nitroso N-phenylhydroxylamine (details of the synthesis and characterization of the metalcupferronates M$^X$Cu$_X$ (M: Fe, Cu, Mn) are provided infra). In all three cases the elemental analysis and the powder X-ray diffraction (XRD) patterns agreed well with single-crystal data (12–14). In addition, FT-IR spectroscopy excluded the presence of excess Cupferron, water, or solvent molecules, and agreed well with results given in the literature (15).

Dried powders of metal cupferronates show sharp decomposition temperatures (see FIG. 1, left) of 180° C., 230° C., and 205° C. for FeCup$_3$, MnCup$_2$, and CuCup$_2$, respective when heated in a DTA/TGA apparatus under nitrogen (ΔT= 10° C. /min., 25° C.–500° C.). In FIG. 1 right, the XRDs of the respective decomposition products reveal that they consist of γ-Fe$_2$O$_3$, MnO, and Cu. The latter is a consequence of the reduction of CuO/Cu$_2$O by the reducing atmosphere given by the organic decomposition products of the Cupferron complex. This result proves that metal Cupferron complexes can indeed act as molecular precursors for transition metal oxides in the absence of O$_2$ and H$_2$O.

In the following, a typical synthesis yielding iron oxide nanocrystals with 6–7 nm particle diameters is described. To remove oxygen and water, 7 g of trioctylamine was heated to 100° C. for 1–1.5 h and repeatedly evacuated to 20 mTorr and purged with Ar. A solution of 0.3 M FeCup$_3$ in octylamine was treated the same way at 60° C. The reaction was initiated by the rapid injection of 4 mL of FeCup$_3$ stock solution into the trioctylamine at 300° C. under vigorous magnetic stirring and an Ar atmosphere. A color change of the liquid from colorless to dark-brown and the evolution of gas indicated the decomposition of the metal Cupferron complex. After the liquid was heated for 30 min at 225° C., the reaction was stopped and the liquid was allowed to cool. At room temperature the flask contained nanocrystals of iron oxide, in both a dark-brown, clear liquid supernatant and a precipitate. The latter results from the high concentration of nanocrystals and their limited solubility in trioctylamine at low temperature. Adding 1–2 mL of organic solvents such as toluene, hexane, $CHCl_3$, etc. to this precipitate yielded clear, deep-brown dispersions of iron oxide nanocrystals which were stable for weeks at room temperature. Low-resolution TEM imaging (see FIG. 2 left) revealed particles with an average size of 6.7 nm and a standard deviation of 1.4 nr.

By addition of a 3-fold volume excess of methanol, the iron oxide nanocrystals could be reprecipitated as a brown powder. Adding methanol to the supernatant of the reaction led to a brown precipitate of iron oxide nanocrystals, which could also be dispersed and reprecipitated by suitable solvents. For both fractions, dispersion and reprecipitation a could be repeated several times.

By washing the precipitate excessively with methanol, the surfactant could be removed yielding typically about 50–60 mg of a brown insoluble powder after drying. This powder still contained about 10% of volatile compounds as indicated by therrnal gravimetric analysis between 300 K and 1100 K in an $O_2$ atmosphere. The overall yield of iron oxide is thereby estimated to 45 mg to 55 mg, which corresponds to about 50% of the iron injected as cupferron complex. Similar procedures were used in the synthesis of manganese oxide and copper oxide nanocrystals. In the case of manganese oxide, 4 ml of a 0.3 M solution of $MnCup_2$ in octylarmine were injected into 7 g trioctylamine at 360° C. and refluxed for 10 min. at 275° C. An orange precipitate was obtained after the reaction, which changed color to brown upon dispersion in toluene. Low-resolution TEM images (see FIG. 2, middle) of this dispersion indicated the presence of 12.0±4.7 mrn $Mn_3O_4$ particles.

In the case of $CuCup_2$, hexadecylamine was used as a surfactant to disperse the precipitated nanocrystalline copper oxide in organic solvents like toluene, hexane, $CHCl_3$ etc. In addition, the reaction had to be stopped immediately after injection since the information of metallic Cu instead of the copper oxide is favored at high temperatures under the strongly reducing conditions of the reaction. In detail, 2 ml. of a 0.3 M solution $fCuCu_2$ in octylamine were injected into 5.5 g hexadecylamine at 250° C. The reaction was stopped by removing the heat as soon as the temperature reached again 230° C. The average particle size as determined from low-resolution TEM imaging is 6.9±2.5 nm (see FIG. 2, right).

Powder XRD reveals the nanocrystalline nature of the described samples (FIG. 3). The diffraction patterns were fitted with the program PowderCell (16) using structure data for $\gamma\text{-}Fe_2O_3$, $Mn_3O_4$, and $Cu_2O$ as models (17–19). Using the Debye-Scherrer is equation (20), a crystallite size was determined for every reflection, and all were averaged to give the mean values reported in FIG. 3. These averaged crystallite sizes are in good agreement with mean diameters determined from low-resolution TEM imaging (compare with results in FIG. 2).

Particles with average sizes down to 4 nrn were synthesized by lowering the injection temperature and/or lowering the injected precursor concentration. For instance, injecting the $FeCup_3$ precursor solution at 250° C. and refluxing at 200° C. for 30 mnin, instead of 300° C. and 225° C. as in the sample of FIG. 2 (see also FIG. 4, left), yields $\gamma\text{-}Fe_2O_3$ nanocrystals 5.2±1.5 nm in size (see FIG. 4 middle). However, the injection of an additional 2 mL of precursor solution after 5 min of refluxing at 200° C. results in particles with diameters of 6.1±1.8 nm (see FIG. 4 right).

The influence of the reflux time is shown in FIG. 5 for an injection of 4 ml 0.3 M $FeCup_3$/Octylamine solution into 7 g trioctylamine at 250° C. and subsequent refluxing at 200° C. Apparently, the particle growth is essentially finished after 10 min. and only a small increase in the width of the size distribution is observed with longer refluxing tirne. This behavior is similar to the growth kinetics of semiconductor nanocrystals.(2) However, further studies are necessary to achieve a similar understanding of the growth kinetics of oxide nanocrystals.

In all cases it was observed that subsequent extractions of the reaction precipitate with small amounts of toluene yielded fractions containing continuously bigger particles. In the case of the preparation with an additional secondary injection, each subsequent extraction of the reaction precipitate resulted in approximately a 1 nm increase in the average particle diameter (seex FIG. 6). Consequently, the fifth fraction contained $\gamma\text{-}Fe_2O_3$ nanocrystals which were 10.0±1.5 nm in diameter. A low-resolution TEM image of this fraction is shown in FIG. 7. Apparently, the slow evaporation of a dispersion of nanocrystals in toluene on a TEM grid leads to the formation of an extended monolayer of particles. The covered area is larger than 2 $\mu m^2$ and extends beyond the part shown in FIG. 2. Each particle is separated from neighboring particles by its shell of surfactant. Currently, the relatively broad size distribution of 15% prevents the formation of ordered superlattices as observed with other systems (3,21,22) However, we believe that by using size-selective precipitation (23), in addition to size-selective extraction during the isolation process, we will be able to achieve size distributions with less than 10% standard deviation.

The crystallinity of these particles is revealed by high-resolution TEM imaging as shown in FIG. 7 (top left). The observed lattice plane distances of 4.77 Å and 4.11 Å, as well as the angle of about 50° between the crossed fringes, indicate the presence of tetragonal $\gamma\text{-}Fe_2O_3$ with an ordered superlattice of cation vacancies (17). The corresponding lattice planes are (113) and (201), respectively, and the FFFi (top right) of the high-resolution image indicates that the particle was imaged along its [51-2] zone axis. Neither cubic $\gamma\text{-}Fe_2O_3$ with a statistical distribution of cation vacancies over the octahedral sites nor $Fe_3O_4$ shows a similar agreement (17,24). In other high-resolution TEM images, we observe particles with lattice plane distances of 4.97 and 4.27 Å that also belong uniquely to the tetragonal superstructure phase of $\gamma\text{-}Fe_2O_3$ (see following table 1 for comparison). Interestingly, it has been reported that this ordered superstructure phase occurs only in particles with diameters larger than 100 nm (25).

TABLE 1

| experimental | $\gamma\text{-}Fe_2O_3$ (cubic) | $\gamma\text{-}Fe_2O_3$ (tetragonal) | $F_3O_4$ |
| --- | --- | --- | --- |
| 4.97 ± 0.05 Å | | 5.01 (104) | |
| 4.77 ± 0.05 Å | 4.82 (111) | 4.82 (113) | 4.85 (111) |
| 4.27 ± 0.05 Å | | 4.30 (105), (114) | |
| 4.11 ± 0.05 Å | | 4.12 (201) | |
| 2.86 ± 0.05 Å | 2.95 (220) | 2.93 (221), (108) | 2.97 (220) |
| | | 2.87 (222) | |
| 2.39 ± 0.05 Å | 2.41 (222) | 2.43 (305), (314) | 2.42 (222) |
| | | 2.41 (226) | |
| | | 2.40 (1010), (218) | |

Prepaation of Metal Cupferron Precursors

EXAMPLE 1

Synthesis of $FeCup_3$

The procedure described in the literature (26), was used to prepare the $FeCup_3$ complex. 1.12 g $FeCl_3 \cdot 6H_2O$ were dissolved in 280 ml of 1% HCl in H₂O. To this solution, 140 ml conc. HCl were added, and this mixture was diluted with 525 rnl H₂O and cooled in a fridge for about 15 mn. Then 3 g ammonium cupferron dissolved in 100 ml H₂O were added dropwise from a burette yielding a red-brown precipitate. After 15 min of standing, the precipitate was filtered and dissolved in CHCl₃. Water was removed in a separation funnel and the resulting deep-red solution was concentrated to about 5–10 ml in a rotavapor and additionally filtered with a glass filter. Hexane was then added until the solution became slightly turbid and the flask was placed into a fridge at −20° C. Within one day, large deep-red crystals grew which were isolated by decanting and dried in vacuum at 40° C. The yield of this product was typically 60–80% with respect to iron. The experimental powder x-ray diffraction pattern (see FIG. 8, left) agrees very well with calculated patterns based on single crystal structure data.(12) The results of the elemental analysis (calc. values in brackets) are for FeCup₃: 12.5% (12.0%) Fe, 46.1% (46.3%) C, 17.5% (18.0%) N, and 3.4% (3.2%) H. The FR-IR spectrum in FIG. 9 (left) agrees well with results in literature (15) and shows the Fe—O stretch band at 427 cm⁻¹.

EXAMPLE 2

Synthesis of MnCup₂

Adding 6 g ammonium cupferron dissolved in 200 mnl H₂O to a solution of 1.80 g MnC₂.4H₂O in 700 ml H₂O yielded an orange precipitate, which was isolated after 15 min. by filtration. This precipitate was dried at 20 mtorr at room temperature for several hours and the yield was typically about 50% with respect to manganese. The experimental powder x-ray diffraction pattern (see FIG. 8, middle) agrees very well with calculated patterns based on single crystal structure data.(14) The results of the elemental analysis (calc. values in brackets) are for MnCup₂: 17.2% (16.2%) Mn, 41.6% (43.8%) C, 16.4% (17.0%) N, 3.27% (3.1%) H. The FT-IR spectra of this compound is displayed in FIG. 9 (middle) and shows the Mn—O stretch band at 405 cm³¹ ¹ which is in agreement with literature results.(15)

EXAMPLE 3

Synthesis of CuCu₂

CuCup₂ was prepared by adding dropwise 6 g annmonium cupferron dissolved in 200 ml H₂O to a solution of 1.54 g CuCl₂.4H₂O in 1.4 1 H₂O. The resulting blue-gray precipitate was filtered after 15 min and dissolved in pyridine yielding a deep green solution. The solution was concentrated in a rotavapor and filtered with a glass filter. To this solution a mixture of n-butanol and hexane was added until the solution was slightly turbid. After one day in a fridge at −20° C. the solution contained large deep-green crystals which were isolated from the supernatant by decanting and dried at 40° C. under vacuum The yield of the resulting blue-gray powder was typically 50–70% with respect to copper. The experimental powder x-ray diffraction pattern (see FIG. 8, right) agrees very well with calculated patterns based on single crystal structure data. (13). The results of the elemental analysis (calc. values in brackets) are for CuCup₂: 19% (18.8%) Cu, 43.1% (42.7%) C, 15.8% (16.6%) N, and 3.3% (3.0%) H. FIG. 9 (right) shows the FT-IR spectrum of the complex which agrees well with literature results (15) and shows the Cu—O stretch vibration at 437 cm⁻¹.

EXAMPLE 4

Synthesis of CoCup₂

2.14 g CoCl₂.6H₂O are dissolved in 1.4 1 H₂O and 6 g Cupferron dissolved in 200 ml H₂O are added dropwise. The resulting solution showed a deep-red color but no precipitate. Consequently, additional 2.28 g CoCl₂.6H₂O and 6 g Cupferron were added resulting in a pinkish precipitate while standing overnight. The precipitate was filtrated and recrystallized from pyridine.

EXAMPLE 5

Synthesis of CdCup₂

1.66 g CdCl₂ are dissolved in 1.4 1 H₂O and 6 g Cupferron dissolved in 200 ml H₂O are added dropwise. The resulting precipitate is filtrated. X-ray diffraction shows a crystalline product which is used without further purification.

Preparation of Surfactant-Capped γ-Fe₂O₃ Nanocrystals

EXAMPLE 6

Preparation of About 6–7 nm γ-Fe₂O₃ Nanocrystals Capped by Trioctylamine

To remove oxygen and water, 7 g of trioctylamine was heated to 100° C. for 1–1.5 h and repeatedly evacuated to 20 mtorr and purged with Ar. A solution of 0.3 M FeCup₃ in octylamine was treated the same way at 60° C. The reaction was initiated by the rapid injection of 4 ml of FeCup₃ stock solution into the trioctylamine at 300° C. under vigorous magnetic stirring and an Ar atmosphere. A color change of the liquid from colorless to dark-brown and the evolution of gas indicated the decomposition of the metal cupferron complex. After heating for 30 min. at 225° C., the reaction was stopped and the liquid was allowed to cool down. At room temperature the flask contained nanocrystals of iron oxide, both in a dark-brown, clear liquid supernatant and a precipitate. The latter results from the high concentration of nanocrystals and their limited solubility in trioctylamine at low temperature. Adding 1–2 ml of organic solvents like toluene, hexane, CHCl₃, etc. to this precipitate yielded clear, deep-brown dispersions of iron oxide nanocrystals which were stable for weeks at room temperature. Low-resolution TEM imaging revealed the presence of iron oxide nanocrystals with an average size of 6.7±1.4 nm (see FIG. 2, left). By addition of a threefold volume excess of methanol, the iron oxide nanocrystals could be reprecipitated as a brown powder. Adding methanol to the supernatant of the reaction lead to a brown precipitate of iron oxide nanocrystals, which could also be redispersed and reprecipitated by suitable solvents. For both fractions, dispersion and reprecipitation could be repeated several tirnes.

EXAMPLE 7

Preparation of About 6–7 nm γ-Fe₂O₃ Nanocrystals Capped by hexadecylamine

To remove oxygen and water, 7 g of hexadecylamine was heated to 100° C. for 1–1.5 h and repeatedly evacuated to 20 mtorr and purged with Ar. A solution of 0.3 M FeCup₃ in octylamine was treated the same way at 60° C. The reaction was initiated by the rapid injection of 2 ml of FeCup₃ stock solution into the hexadecylamine at 300° C. under vigorous magnetic stiring and an Ar atmosphere. A color change of the liquid from colorless to dark-brown and the evolution of gas indicated the decomposition of the metal cupferron complex. After heating for 60 min. at 265° C., the reaction was stopped and the liquid was allowed to cool down. At about 100° C. the reaction mixture was transferred into an excess of methanol (3:1) yielding a brown precipitate and a clear yellow-brown supernatant. After isolating the precipitate by centrifugation and discarding the supernatant, the precipitate can be dispersed in organic solvents like toluene, chloroform, hexane etc. Adding methanol to this dispersion yields again a brown precipitate. Redispersion and reprecipitation by suitable solvents could be repeated several times.

EXAMPLE 8

Preparation of About 5 nm $\gamma$-$Fe_2O_3$ Nanocrystals Capped by Hexadecylamine To remove oxygen and water, 7 g of hexadecylamine was heated to 100° C. for 1–1.5 h and repeatedly evacuated to 20 mtorr and purged with Ar. A solution of 0.3 M $FeCup_3$ in octylamine was treated the same way at 60° C. 2 ml of 0.3 M $FeCup_3$/Octylamine were added to the hexadecylamine at 100° C. and the solution was heated to 280° C. under vigorous magnetic stirring and an Ar atmosphere. Upon reaching 140–160° C., gas evolution indicated the onset of the precursor decomposition. After about 12 min. of heating, the liquid reached a temperature of 280° C. and was refluxed at this temperature for another 48 min. After the heating was stopped, the reaction mixture was transferred at 100° C. into an excess of methanol (2:1). The resulting precipitate was isolated by centrifugation and could be redispersed in toluene, hexane, chloroform etc. By adding methanol to this dispersion, the nanocrystals could be reprecipitated. Redispersion and reprecipitation could be repeated several times.

EXAMPLE 9

Preparation of About 9 nm $\gamma$-$Fe_2O_3$ Nanocrystals Capped by Hexadecylamine To remove oxygen and water, 7 g of hexadecylamine was heated to 100° C. for 1–1.5 h and repeatedly evacuated to 20 mtorr and purged with Ar. A solution of 0.3 M $FeCup_3$ in octylamine was treated the same way at 60° C. The reaction was initiated by the rapid injection of 2 ml of $FeCup_3$ stock solution into the hexadecylamine at 300° C. under vigorous magnetic stirring and an Ar atmosphere. A color change of the liquid from colorless to dark-brown and the evolution of gas indicated the decomposition of the metal cupferron complex. After 6 min. an additional 2 ml of stock solution were added dropwise within the time range of 3 min. Additional slow injections of 2 ml stock solution took place 2 more times at 14 min. and 50 min. after the initial injection, respectively. After the last injection was finished, the liquid was heated for another 20 min. before heating was stopped and the liquid was allowed to cool down. At about 100° C. the reaction mixture was transferred into an excess of methanol (3:1) yielding a brown precipitate and a clear yellow-brown supernatant. After isolating the precipitate by centrifugation and discarding the supernatant, the precipitate can be redispersed in organic solvents like toluene, chloroform, hexane etc. Adding methanol to this dispersion yields again a brown precipitate. Redispersion and reprecipitation by suitable solvents could be repeated several times.

EXAMPLE 10

Preparation of About 12 nm $Mn_3O_4$ Nanocrystals Capped by Hexadecylamine

To remove oxygen and water, 7 g of trioctylamine was heated to 100° C. for 1–1.5 h and repeatedly evacuated to 20 mtorr and purged with Ar. A solution of 0.3 M $MnCup_2$ in octylamine was treated the sarne way at 60° C. The reaction was initiated by the rapid injection of 4 mnl of $MnCup_2$ stock solution into the trioctylamine at 360° C. under vigorous magnetic stirring and an Ar atmosphere. A color change of the liquid from colorless to dark-brown and the evolution of gas indicated the decomposition of the metal cupferron complex. The liquid was refluxed for 10 mnin. at 275° C. before heating was stopped. At room temperature the flask contained nanocrystals of manganese oxide, both in an orange-brown, clear liquid supernatant and a brown precipitate. Adding 1–2 ml of organic solvents like toluene, hexane, $CHCl_3$, etc. to this precipitate yielded clear, deep-brown dispersions of manganese oxide nanocrystals. By addition of a threefold volume excess of methanol, the manganese oxide nanocrystals could be reprecipitated as a brown powder. Adding methanol to the supernatant of the reaction lead to a brown precipitate, which could also be redispersed and reprecipitated by suitable solvents. For both fractions, dispersion and reprecipitation could be repeated several times. Low-resolution TEM images of this sample are shown in FIG. 2 (middle). The average particle size and size-distribution as determined from this image is 12.0±4.7 nrn.

EXAMPLE 11

Preparation of About 7 nm $Cu_2O$ Nanocrystals Capped by Hexadecylamine

To remove oxygen and water, 5.5 g of hexadecylamine was heated to 100° C. for 1–1.5 h and repeatedly evacuated to 20 mtorr and purged with Ar. A solution of 0.3 M $CuCup_2$ in octylamine was treated the same way at 60° C. 2 ml of a 0.3 M solution of $CuCup_2$ in octylamine were injected into 5.5 g hexadecylamine at 250° C. causing the temperature to drop to about 215° C. The reaction was stopped by removing the heat as soon as the temperature reached again 230° C. At about 100 OC, the liquid was transferred into an excess of methanol (3:1) yielding a brown precipitate which was isolated by centrifugation. This precipitate could be redispersed in organic solvents like toluene, hexane, chloroform and again reprecipitated by addition of methanol. The average particle size and size-distribution as determined from low-resolution TEM imaging is 6.9±2.5 nm.

EXAMPLE 12

Preparation of About 20 nm CdO Nanocrystals Capped with Hexadecylamine

To remove oxygen and water, 7 g of hexadecylamine was heated to 100° C. for 1–1.5 h and repeatedly evacuated to 20 mtorr and purged with Ar. A solution of 0.3 M $CdCup_2$ in octylamine was treated the same way at 60° C. 3 ml of a 0.3 M solution of $CdCup_2$ in octylamine were injected into 7 g hexadecylamine at 300° C. The liquid was refluxed for 30 min. at 245° C. before heating was stopped. At 100° C. the liquid was transferred into an excess of methanol (3:1). The resulting brown precipitate was isolated by centrifugation and dispersed in toluene, chloroform or hexane. By addition of methanol, a brown precipitate could be recovered.

EXAMPLE 13

Preparation of 9 nm CoO Nanocrystals Capped with Trioctylamine

To remove oxygen and water, 7 g of trioctylamine was heated to 100° C. for 1–1.5 h and repeatedly evacuated to 20 mtorr and purged with Ar. A solution of 0.3 M CoCup$_2$ in octylamine was treated the same way at 60° C. 4 ml of this solution were injected at 300° C. into the trioctylamine and refluxed for 20 min. at 230° C. The liquid was allowed to cool to 100° C. and transferred into an excess of methanol (3:1). The resulting grey precipitate could be redispersed in toluene, chloroform or hexane. By addition of methanol, the nanocrystals could be recovered as a powder.

The preferred metals for use in preparing the M$^X$Cup$_X$ precursor for use in the process of this invention are transition metals, more preferably either Fe, Mn, or Cu.

Additionally, while the Cup compound most commonly used in the formation of the precursor is N-nitroso-N-phenyl-hydroxylamine, other N-substituted N-Nitroso hydroxylamine compounds can be used. Any compound having the head group (O—N—N—O) can be used. Broadly speaking, any N-substituted N-nitroso-hydroxylamine of the formula RN2O2 where R is a phenyl, benzyl, naphtyl, biphenyl, methyl, propyl, etc. would be suitable for use. Specific compounds include, for example, N-nitroso-N-phenyl-hydroxylamine, N-nitroso-N[1]-naphthyl-hydroxylamine, N-nitroso-N-biphenyl-4-yl-hydroxylamine, N-nitroso-N[2]-fluorenyl-hydroxylamine, N-nitroso-N-benzyl-hydroxylamine, N-nitroso-N-(4-nitrophenyl)-hydroxylamine, N-nitroso-N-trityl-hydroxylamine, and N-nitroso-N-isopropyl-hydroxylamine, their salts, such as ammonium salts, and the like.

The coordinating surfactant is preferably amine based, and most preferably is trioctylamine, or hexadecylamine. Other suitable amines include dioctylamine, and dibenzylamine. Still other suitable surfactants include primary, secondary or tertiary alkyl-or aryl-amnes; primary, secondary or tertiary alkyl-or aryl-phosphines, such as tributylphosphine, triphenylphosphine; primary, secondary or tertiary alkyl- or aryl-phosphine oxides such as octylphosphine oxide, and dihexylphosphine oxide and trioctylphosphine oxide; dialkyl-, diaryl- or aryl-alkyl-ethers such as dioctylether, and dibenzylether; carboxyhc acids such as oleic acid, and lauric acid; and nitrites such as pentadecanitrile, as well as derivatives and mixtures thereof. Whatever surfactant that is used, it should have a polar head group attached to an apolar alkyl or aryl rest.

The process is carried out in an inert atmosphere in the absence of water, air, or oxygen. The preferred inert atmosphere is argon gas, but nitrogen or any other inert gas can be used.

The mixture of metal cupferron complex and coordinating surfactant is heated to a temperature sufficient to cause the thermal decomposition of the precursor and formation of the nanocrystals. In general, the temperature to which the mixture is heated can range from 150 to 400 degrees C., preferably from 220 to 350 degrees C., and most preferably from 250 to 300 degrees C. The exact temperature to which the mixture is heated will depend on the reactants and the duration that heat is applied.

The nanocrystals produced by the process of this invention range from about 2 to about 20 nm in diameter. Crystals of varying sizes within this range can be achieved by varying the reaction conditions, such as time, temperature, choice of surfactant and precursor to surfactant ratio, as will be apparent to those skilled in the art.

The nanocrystals produced by the method of the invention are dispersable in organic solvents such as toluene, chloroform, and hexane and other aromatic, halogenated or aliphatic hydrocarbons.

Broadly speaking, the process of the invention comprising mixing the metal rci cupferron precursor with the coordinating surfactant, and heating the mixture until decomposition of the precursor occurs, and formation of the desired nanocrystals is achieved. The preferred mode by which this is accomplished is to inject the precursor into a hot liquid surfactant and maintain it at the desired temperature and for a sufficient period of time for the reaction to occur. Thus the term "mixing" as used herein, also includes injection of the precursor into a hot liquid surfactant. Any other means of mixing the two can be used, however.

It will be understood by those skilled in the art that various modifications can be made in the process and compounds of the invention without departing from the spirit and scope thereof.

We claim:

1. A process for making dispersable surfactant capped nanocrystals of metal oxides which comprises: (a) mixing a solution of a metal cupferron precursor complex of the formula M$^X$Cup$_X$, wherein M$^X$ is a metal ion in the oxidation state X selected from the group consisting of elements in Group 2, Group 3–12 of the 4$^{th}$ period, Group 3–6 of the 5$^{th}$ and 6$^{th}$ period, Group 10–12 of the 5$^{th}$ period, Group 12 of the 6$^{th}$. Groups 13 to 15, and the Lanthanide and Actinide series of the periodic table, and X is a number between 1 and 4, and Cup is a N-substituted N-nitroso hydroxylamine, with a coordinating surfactant, and (b) heating the mixture at a temperature and for a sufficient period of time to cause thermal decomposition of the M$^X$Cup$_X$ precursor and formation of the nanocrystals.

2. The process of claim 1 wherein the process is conducted in an inert atmosphere.

3. The process of claim 2 wherein said inert atmosphere is argon or nitrogen gas.

4. The process of claim 1 wherein said process is conducted in the absence of water, air or oxygen.

5. The process of claim 1 wherein the mixture is heated to or maintained at a temperature ranging from about 150° C. to about 400° C.

6. The process of claim 1 wherein M is Fe.

7. The process of claim 1 wherein M is Mn.

8. The process of claim 1 wherein M is Cu.

9. The process of claim 1 wherein said coordinating surfactant is an organic molecule consisting of a polar headgroup and an apolar group providing stabilization against coagulation and precipitation of particles.

10. The process of claim 9 wherein said coordinating surfactant is hexadecylamine or trioctyl amine.

11. The process of claim 1 wherein said N-substituted N-nitroso hydroxylamine is N-nitroso-N-phenyl hydroxylamine.

12. The process of claim 1 wherein M is Fe, Cup is N-nitroso-N-phenyl hydroxylamine, and the coordinating surfactant is hexadecylamine.

13. A process for making dispersable surfactant capped nanocrystals of metal oxides with non-hydroxylated particle surfaces which comprises -mixing a solution of a metal cupferron complex of the formula M$^X$Cup$_X$, wherein M$^X$ is a metal ion in the oxidation state X selected from the group consisting of elements in Group 2, Group 3–12 of the 4$^{th}$ period, Group 3–6 of the 5$^{th}$ and 6$^{th}$ period, Group 10–12 of the 5$^{th}$ per Group 12 of the 6$^{th}$ period, Groups 13 to 15, and the Lanthanide and Actinide series of the periodic table, and X is a number between 1 and 4, and Cup is cupferron, into an amine based coordinating surfactant, at a temperature ranging from about 250° C. to about 300° C., and allowing the reaction to proceed for a period of time sufficient to cause thermal decomposition of said M$^X$Cup$_X$, and formation of the nanocrystals.

14. A surfactant capped nanocrystal made in accordance with the process of claim 1.

15. A process for making soluble surfactant capped nanocrystals of transition metal oxides with non-hydroxylated particle surfaces which comprises injecting a solution of a metal cupferron complex of the formula $M^x Cup_x$, where x is a number between 1 and 4, wherein M is selected from the group consisting of Fe, Mn, and Cu, and Cup is N-nitroso-N-phenyl hydroxylamine, into a coordinating surfactant, the injection being conducted at a temperature ranging from about 220° C. to about 350° C., for a period of time sufficient to complete the process.

16. A process for making surfactant capped nanocrystals of transition metal oxides which comprises injecting a solution of a metal cupferron complex of the formula $M^x Cup_x$, where x is a number between 1 and 4, andwherein M is selected from the group consisting of Fe, Mn, andCu, and Cup is N-nitroso-N-phenyl hydroxylamine, into an amine based coordinating surfactant, the injection being conducted at a temperature ranging from about 150° C. to about 400° C., for a period of time sufficient to complete the eaetion process.

17. The process of claim 1 wherein the numerical value of X is 1.

18. The process of claim 1 wherein the numerical value of X is 2.

19. The process of claim 1 wherein the numerical value of X is 3.

20. The process of claim 1 wherein the numerical value of X is 4.

* * * * *

UNITED STATES PATENT AND TRADEMARK OFFICE
CERTIFICATE OF CORRECTION

PATENT NO.       : 6,984,369 B1
APPLICATION NO.  : 09/721126
DATED            : January 10, 2006
INVENTOR(S)      : A. Paul Alivisatos and Joerg Rockenberger It is certified that error appears in the above-identified patent and that said Letters Patent is hereby corrected as shown below:

Col. 1 lines 23-24

STATEMENT REGARDING FEDERAL SPONSORSHIP after "The invention described herein arose in the course of, or under," add -- U.S. Government support from the Air Force Office of Scientific Research under Grant No. F49620-98-1-0243 and --

Signed and Sealed this
Twentieth Day of September, 2011

David J. Kappos
*Director of the United States Patent and Trademark Office*